United States Patent
Mo et al.

(10) Patent No.: US 8,594,621 B2
(45) Date of Patent: Nov. 26, 2013

(54) USAGE SHARING ACROSS FIXED LINE AND MOBILE SUBSCRIBERS

(75) Inventors: Fan Mo, Ottawa (CA); Kevin Cutler, Carp (CA); Hamdy Farid, Kanata (CA)

(73) Assignee: Alcatel Lucent, Paris (FR)

( * ) Notice: Subject to any disclaimer, the term of this patent is extended or adjusted under 35 U.S.C. 154(b) by 189 days.

(21) Appl. No.: 13/251,573

(22) Filed: Oct. 3, 2011

(65) Prior Publication Data
US 2013/0084826 A1    Apr. 4, 2013

(51) Int. Cl.
*H04M 11/00* (2006.01)
(52) U.S. Cl.
USPC .......................... 455/406; 455/405; 455/445
(58) Field of Classification Search
USPC .......... 455/405, 406, 445; 379/144.1, 144.15, 379/114.2; 705/42
See application file for complete search history.

(56) References Cited

U.S. PATENT DOCUMENTS

2003/0086548 A1*  5/2003  Nelson ...................... 379/144.01
2012/0047069 A1*  2/2012  Kelly et al. ...................... 705/42

* cited by examiner

*Primary Examiner* — Manpreet Matharu
(74) *Attorney, Agent, or Firm* — Kramer & Amado P.C

(57) ABSTRACT

Various exemplary embodiments relate to a method for determining the usage of a subscriber to mobile and fixed line services including: receiving subscriber usage information from a fixed line network; receiving subscriber usage information from a mobile network; computing a usage metric based upon the received subscriber usage information from the fixed line network and the mobile network and rating factor information; comparing the usage metric to a predetermined usage threshold; determining a usage policy action; and transmitting a usage policy action message.

24 Claims, 3 Drawing Sheets

US 8,594,621 B2

USAGE SHARING ACROSS FIXED LINE AND MOBILE SUBSCRIBERS

TECHNICAL FIELD

Various exemplary embodiments disclosed herein relate generally to usage sharing across fixed line and mobile subscribers.

BACKGROUND

Many mobile service providers provide so called "family plans" that allow for usage sharing across several mobile devices. Subscribers to mobile service plans often also have a fixed line service that may provide voice, internet, and/or television service. Subscribers to mobile and fixed line services currently have separate usage limits and policies for each of these services even if they are part of the same subscriber account.

SUMMARY

Therefore there remains a need for a service plan that allows for sharing across fixed line and mobile services. In such a plan the subscriber would pay for a specific overall usage limit that may be shared to access various services across both the mobile network and the fixed line network. Next generation wireless services may include a policy and charging rules function (PCRF) that monitors usage in a mobile network. This PCRF may also be modified to receive usage information from a fixed line subscription. A rate factor may be used to scale each type of usage from the mobile and fixed line networks into a single usage metric. By monitoring this usage metric the PCRF may implement various policies regarding mobile and fixed line subscriptions. Further, the use of a single usage metric allows for the sharing of usage resources between the mobile and fixed line subscriptions.

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method for determining the usage of a subscriber to mobile and fixed line services including: receiving subscriber usage information from a fixed line network; receiving subscriber usage information from a mobile network; computing a usage metric based upon the received subscriber usage information from the fixed line network and the mobile network and rating factor information; comparing the usage metric to a predetermined usage threshold; determining a usage policy action; and transmitting a usage policy action message.

Various exemplary embodiments relate to a policy control node that determines a combined usage of a fixed line network and mobile network by a subscriber including: a first interface that communicates with a fixed line network server; a second interface that communicates with a mobile network server; a usage analyzer that receives usage reports from the fixed line network server and the mobile network server to produce a subscriber usage metric; a session manager that manages subscriber sessions; and a policy engine that determines the network policies to apply to the fixed line network and the mobile network based upon the subscriber usage metric.

BRIEF DESCRIPTION OF THE DRAWINGS

In order to better understand various exemplary embodiments, reference is made to the accompanying drawings, wherein.

DETAILED DESCRIPTION

Figure 1:
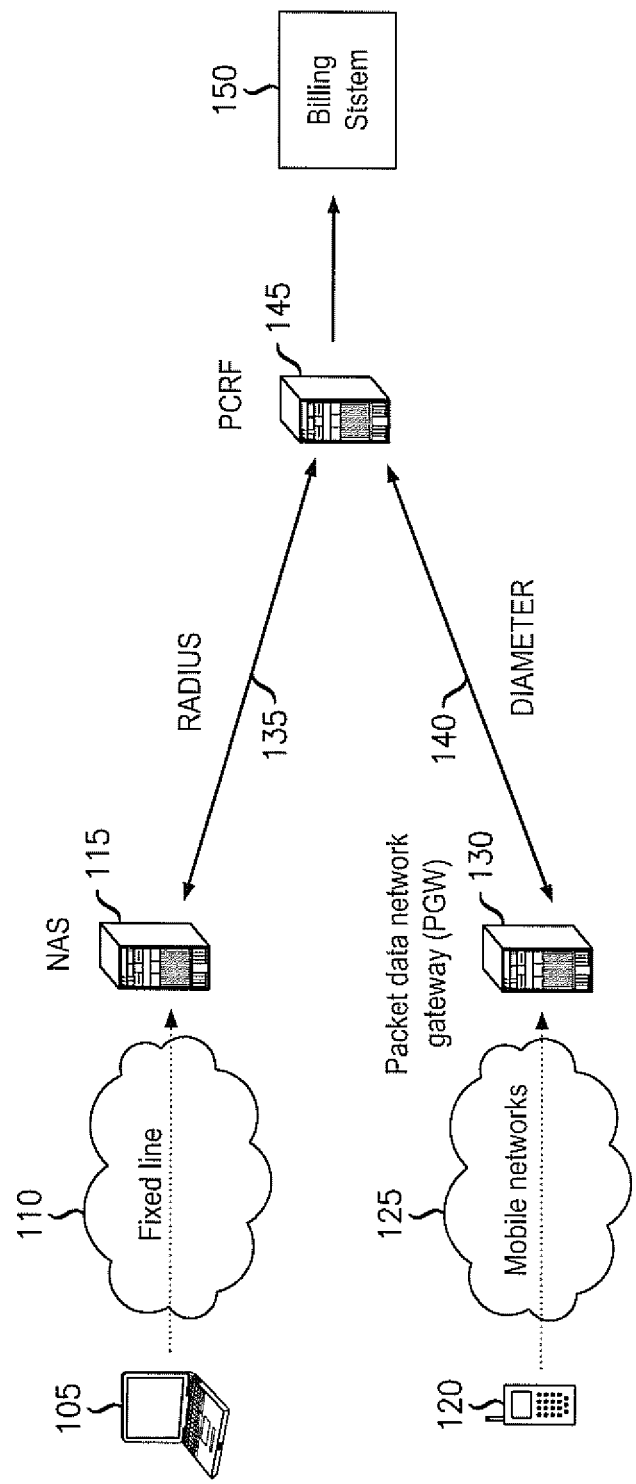
FIG. 1 illustrates an exemplary system that includes a fixed wire subscription and a mobile subscription that utilize a shared usage limit.
Figure 2:
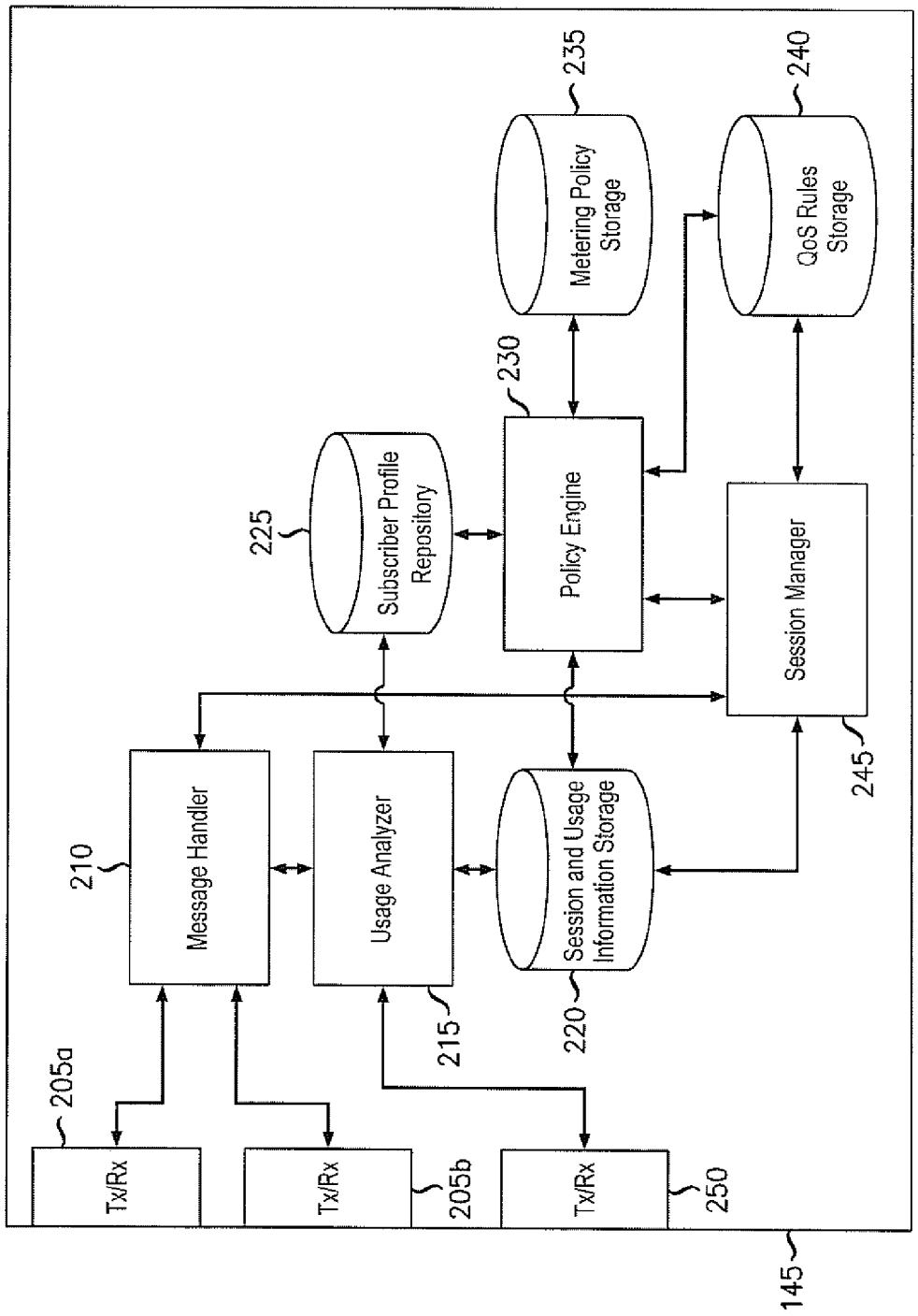
FIG. 2 illustrates an exemplary policy and charging rules function.

Referring now to the drawings, in which like numerals refer to like components or steps, there are disclosed broad aspects of various exemplary embodiments.

FIG. 1 illustrates an exemplary system that includes a fixed wire subscription and a mobile subscription that utilize a shared usage limit. The system 100 may include a fixed computing device 105, a fixed line network 110, a network access server (NAS) 115, a mobile device 120, a mobile network 125, a packet data network gateway (PGW) 130, a first control communication link 135, and second control communication link 140, a policy control and rules function (PCRF) 145, and a billing system 150.

The fixed subscriber device 105 may be any type of desktop, laptop, or tablet computer, a set top box, server, router, or any other device capable of communicating via the fixed line network. The fixed line network 110 is any network that services a fixed location. The fixed line network 110 allows communication between the fixed location and the NAS 115.

NAS 115 may be any server that provides network access for fixed subscriber device 105. NAS 115 may provide network access to the fixed subscriber device 105 by establishing a session with the fixed subscriber device 105. NAS 115 may forward packets between fixed subscriber device 105 and an external network (not shown). It should be recognized that one or more other servers, routers or switches may be located between NAS 115 and the external network. NAS 115 may provide network access for more than one fixed subscriber device 105. NAS 115 may implement a Quality of Service (QoS) for network connections to the fixed subscriber device 105. As used herein, QoS may refer to various parameters such as, for example, bandwidth, priority, delay or other characteristics of a network connection to fixed subscriber device 105. NAS 115 may use packet filters or packet filter rules received from PCRF 145 to control the QoS of a network connection. By filtering packets, NAS 115 may control which services a subscriber may access and how packets for various services are treated.

NAS 115 may send accounting messages to the PCRF 145. Accounting messages may describe a subscriber's usage of the fixed line network with fixed subscriber device 105. Accounting messages may include an identification of the subscriber, connection, or device and a usage amount. The identification may be, for example, an account name, session number, IP address, or MAC address. Usage amount may be measured in, for example, bits, bytes, octets, packets, units of time, or a percentage of a set amount. NAS 115 may use the RADIUS protocol to send accounting messages to PCRF 145 via the first control communication link 135. A RADIUS accounting message may include one or more attribute value pairs (AVPs) indicating a type and value for data. NAS 115 may use vendor-specific AVPs to report usage information.

Further, the NAS may use the DIAMETER or another protocol to send accounting messages to PCRF 145.

The external network may include any network of computing devices. The external network may provide computing services or data to users who connect through a NAS 115. The external network may include Internet Service Provider (ISP) network resources such as servers, routers, switches, wires, cables, fibers, wireless equipment and any other hardware used to provide connections or deliver data.

The mobile device 120 may be a device that communicates with mobile network 125 for providing an end-user with a data service. Such data service may include, for example, voice communication, text messaging, multimedia streaming, and Internet access. More specifically, in various exemplary embodiments, mobile device 110 is a personal or laptop computer, wireless email device, cell phone, tablet, or any other mobile device capable of communicating with the mobile network 125.

The mobile network 125 may include base stations, servers, routers, switches, wires cables, fibers, and any other hardware used to provide connections or deliver data. The base stations may provide the wireless connection to the mobile device 120.

Packet data network gateway (PGW) 130 may be a device that provides gateway access to an external network (not shown) to the mobile device. PGW 130 may include a policy and charging enforcement function (PCEF) that enforces policy and charging control (PCC) rules for each service data flow (SDF). Therefore, PGW 130 may be a policy and charging enforcement node (PCEN). PGW 134 may include a number of additional features such as, for example, packet filtering, deep packet inspection, and subscriber charging support. For example, PGW 130 may provide subscriber usage information to PCRF 145 according to armed metering rules determined by PCRF 145. Accounting messages may include an identification of the subscriber, connection, or device and a usage amount. The identification may be, for example, an account name, session number, IP address, or MAC address. Usage amount may be measured in, for example, bits, bytes, octets, packets, units of time, or a percentage of a set amount. PGW 115 may use the DIAMETER protocol to send accounting messages to PCRF 145 via the second control communication link 140.

The PCRF 145 may make policy decisions based on network information. In various exemplary embodiments, the PCRF 145 may be implemented in a policy and charging rules node (PCRN). For example, PCRF 145 may make subscriber metering policy decisions based on subscriber policies, subscriber information, and network usage information. PCRF 145 may communicate with the PGW 130 via a second control communication link 140 using the DIAMETER protocol. PCRF 145 may arm the PGW 134 with usage reporting rules for desired subscriber usage information. PCRF 145 may generate and/or modify PCC rules to control how the PGW 134 treats subscriber traffic. Further, PCRF 145 may communicate with the NAS 115 via a first control communication link 135 using the RADIUS protocol. PCRF 145 may arm the NAS 115 with usage reporting rules for desired subscriber usage information. PCRF 145 may generate and/or modify PCC rules to control how the NAS 115 treats subscriber traffic.

In the process of making policy decisions, PCRF 145 may make use of one or more rule objects to select applicable policies and actions. PCRF 145 may evaluate rule tables to generate result sets. PCRF 145 may generate rule objects including rule tables from policies configured by a network operator. Upon establishment of a subscriber session or updates to the session, PCRF 145 may evaluate a policy selection table to determine a result set including applicable policies. PCRF 145 may further select one of the applicable policies to apply to the session. The selected policy may include static attributes and additional dynamic rule tables. PCRF 145 may evaluate the dynamic rule tables to determine appropriate actions for managing a subscriber session in compliance with the selected policy.

Because the PRCF 145 receives usage information from both the NAS 135 and the PGW 130, the PCRF 145 has information on the total usage of both the fixed line network 110 and the mobile network 125. This information may be combined and used to send usage information to the billing system 150.

The billing system 150 is any known billing system that may be available in a provider's network. The billing system 150 receives usage information from the PCRF 145 and then issues a single bill that bills for both fixed line network and mobile network usage.

The PCRF 145 may include transmit and receive (Tx/Rx) interfaces 205*a* and 205*b*, message handler 210, usage analyzer 215, session and usage information storage 220, subscriber profile repository 225, policy engine 230, metering policy storage 235, QoS rules storage 240, session manager 245, and billing interface 250. The PCRF 145 may be implemented by software executed on a processor and data storage. Further, various of the individual portions of the PCRF may be specific hardware modules that carry out specific functions of the PCRF.

The Tx/Rx interface 205*a* may be connected to the first communication control link 135. As the first communication control link 135 may communicate using a RADIUS protocol, the Tx/Rx interface 205*a* may be capable of sending and receiving RADIUS messages. The Tx/Rx interface 205*b* may be connected to the second communication control link 140. As the second communication control link 140 may communicate using a DIAMETER protocol, the Tx/Rx interface 205*b* may be capable of sending and receiving DIAMETER messages. In other embodiments, the Tx/Rx interfaces 205*a* and 205*b*, may communication using other communication protocols.

Message handler 210 may include hardware and/or executable instructions on a machine-readable storage medium configured to process application requests, session requests, event notifications, accounting messages and other messages received via Tx/Rx interfaces 205*a* and 205*b*. Message handler 210 may identify accounting messages including usage information and forward the accounting messages to usage analyzer 215. Further, the message handler may be capable of receiving accounting messages in various formats using various protocols. The message handler may reformat or transform accounting messages from one format/protocol to another common format/protocol. For example, in FIG. 1, messages from the NAS may use the RADIUS protocol. The message handle 210 may receive these RADIUS messages and convert them into DIAMETER messages for further processing.

Further, message handler 210 may receive and install new PCC rules in response to an application request. Also, message handler 220 may establish, modify, or terminate sessions in response to a session request based upon instructions from the session manager 245. The new PCC rules may also be directed towards gathering usage information for the session.

Usage analyzer 215 may interpret received accounting messages and track the network usage of subscribers. Upon receiving an accounting message, usage analyzer 215 may query subscriber profile repository 225 with the identity of the subscriber associated with the accounting message. Usage analyzer 215 may also receive a rating factor from the session and usage information storage 220. Usage analyzer 215 may update information in session and usage information storage 230 based on the received message. Usage analyzer 215 may add the amount of usage included in the accounting message to a stored accumulated usage for the subscriber according to the monitoring key. In various exemplary embodiments, usage analyzer 215 may multiply the amount of usage included in the accounting message by the rating factor. This allows for the subscriber to have a single usage metric that includes usage for both the fixed line network 110 and the mobile network 125. For example, usage analyzer 215 may add the amount of usage to the usage metric when the subscriber finishes watching a streaming video. If the VIDEO monitoring key is associated with a rating factor of 3, usage analyzer 215 may multiply the amount of usage by 3 before adding it to the usage metric. Usage analyzer 215 may also periodically reset the usage metric for a subscriber, for example, at the start of a monthly billing cycle. Resetting the usage metric may reduce the subscriber's usage to zero. Other values may be possible after the reset based on the subscriber's contract.

Finally, the usage analyzer 215 may send a usage message to a billing system using billing system interface 250. The billing system is able to take the usage information and produce a single subscriber bill that includes both the fixed line network usage and the mobile network usage.

Session information and usage storage 220 may store information regarding subscriber sessions and network usage. In particular, session information and usage storage 220 may include one or more entries for each subscriber corresponding to a monitoring key and indicating an amount of usage for the subscriber associated with the monitoring key. Each monitoring key may have an associated rating factor that is used to convert the measured usage into the usage metric for the subscriber. The subscriber may include a usage mount associated with the overall usage metric. Usage analyzer 215 may update the entries of session information and usage storage 220 as it receives accounting messages. Policy engine 230 may compare the system metric with the thresholds of a metering policy to determine whether to take a management action. Session information and usage storage 220 may also include other information useful for managing subscriber sessions. For example, session information and usage storage 220 may include a reauthorization time, a rollover date, subscriber contact and billing information or any other information related to the subscriber or session. Session information and usage storage 220 may also be accessible to policy engine 230 and session manager 245.

Subscription profile repository (SPR) 225 may be a device that stores information related to subscribers. Thus, SPR 225 may include a machine-readable storage medium such as read-only memory (ROM), random-access memory (RAM), magnetic disk storage media, optical storage media, flash-memory devices, and/or similar storage media. SPR 225 is shown as a component of PCRF 160, but it may constitute an independent node that communicates with the PCRF 160. Data stored by SPR 225 may include an identifier of each subscriber and indications of subscription information for each subscriber such as subscriber category, bandwidth limits, charging parameters, and subscriber priority.

Policy engine 230 may determine whether to apply a metering policy based on the current usage metric. Policy engine 230 may query metering policy storage 235 to determine a policy to be applied to the subscriber. Policy engine 230 may compare the current usage metric with a threshold value included in the metering policy. If the current usage metric exceeds the threshold value, policy engine 230 may perform a management action indicated in the metering policy. Exemplary management actions that may be included in a metering policy may include, for example: sending notification to the subscriber, adjusting the subscriber's QoS, and/or terminating the subscriber's session. Policy engine 230 may send notification to the customer by generating an e-mail, text message, or other communication method. The notification may include the current usage, the exceeded threshold, other thresholds associated with the subscriber, or any other information about the subscriber or network service. The notification may also include information on how to obtain increased usage, for example, by either providing a web link or directing the subscriber to a website. In this situation the subscriber's usage may be suspended or terminated. Once the subscriber has obtained increase usage, the PCRF 145 may receive a recharge message. The policy engine 230 may then cause the session to be restored or reinitiated based upon the recharge message and adjust threshold values and usage limits for the subscriber.

Policy engine 230 may adjust the QoS of the subscriber by changing QoS rules storage 240 and triggering session manager 245. Likewise, policy engine 230 may terminate the subscriber's session by changing QoS rules storage 240 and triggering session manager 245. Alternatively, policy engine 230 may implement a policy by changing flags or other data to ensure that an existing rule will be applied to a subscriber. These policy changes may be applied to one or both of the fixed line network 110 via the NAS 115 or the mobile network 125 via the PGW 130.

Metering policy storage 235 may store metering policy information. A metering policy may be associated with each subscriber. Metering policy storage 235 may include a set of thresholds associated with a subscriber. A metering policy may also define a policy or action associated with a threshold. The metering policy storage 235 may be used by policy engine 230 to determine what action to take when a subscriber's usage exceeds a threshold associated with the subscriber.

QoS rules storage 240 may store a configurable set of rules for determining the QoS that may be authorized for a subscriber. QoS rules storage 240 may include one or more conditions and a QoS to be authorized if the conditions are met. Policy engine 230 may modify QoS rules if policy engine 230 determines that a subscriber's usage has exceeded a threshold associated with a usage metric. Alternatively, QoS rules storage 240 may include conditions corresponding to various usage metric thresholds. Session manager 245 may use QoS rules storage 240 when determining the QoS that should be authorized for a subscriber session.

Session manager 245 may determine an appropriate QoS to authorize for a subscriber session. Session manager 245 may base the authorized QoS on several factors, including, but not limited to: subscriber usage information, metering policy thresholds, subscriber agreements, current period of time, and/or network congestion. Session manager 245 may use QoS rules storage 240 to determine the authorized QoS. Session manager 245 may authorize a QoS for a subscriber session when the subscriber's current session is about to expire as indicated by a session reauthorization time in session and usage information storage 220. Session manager 245 may also authorize a QoS whenever policy engine 230 detects that the subscriber's usage has exceeded a threshold, when the current time period changes, when a subscriber restarts a session, or when the operator triggers reauthorization.

Figure 3:
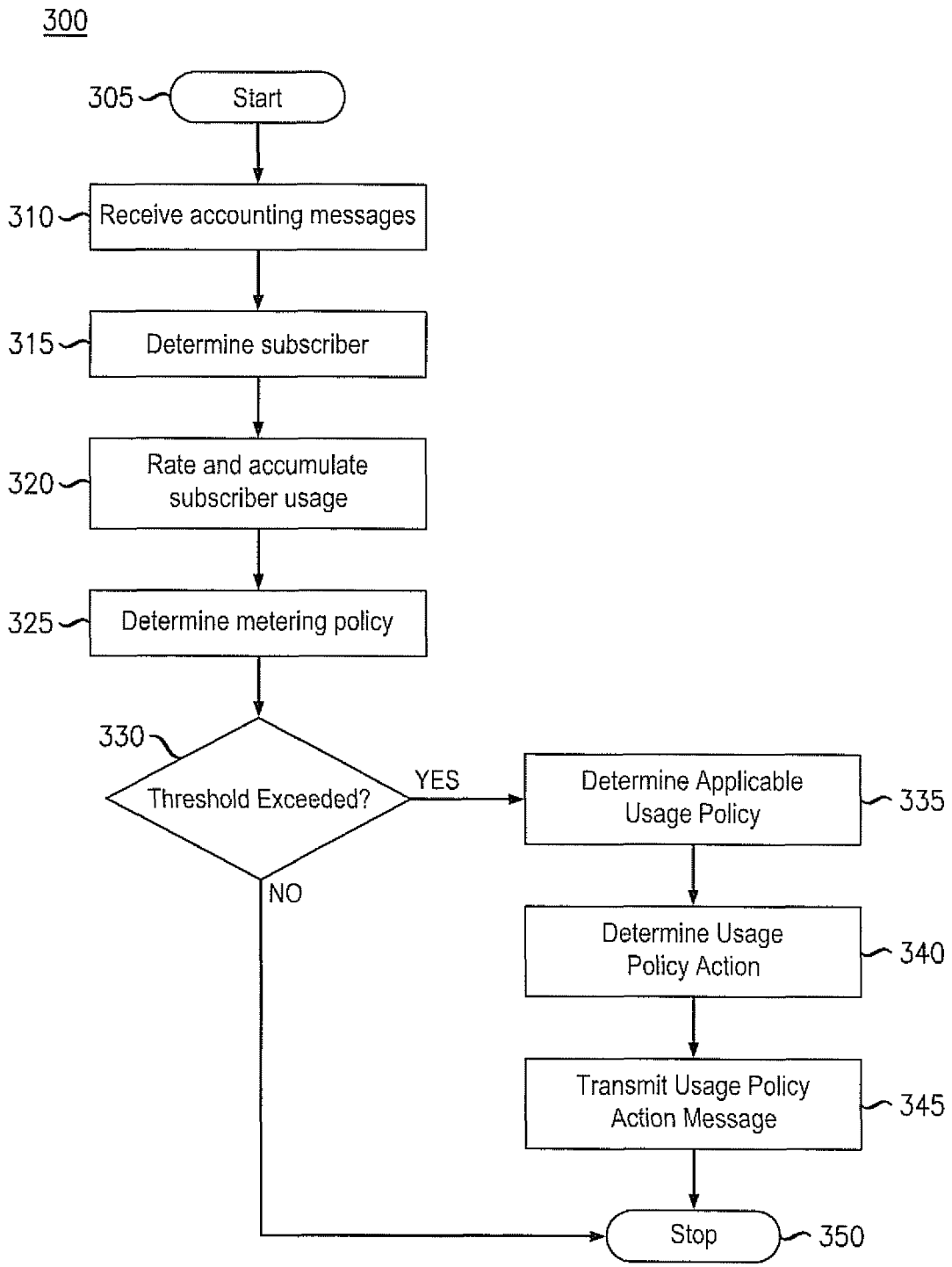
FIG. 3 illustrates a flowchart showing an exemplary method for determining the usage of a subscriber to a mobile and fixed line services.

FIG. 3 a flowchart showing an exemplary method for determining the usage of a subscriber to a mobile and fixed line services. The method 300 may be performed by the various components of the PCRF 160. The method 300 may begin at step 305 and proceed to step 310.

In step 310, the PCRF 145 may receive an accounting message at Tx/Rx interface 205a or 205b. The accounting message may be from, for example, NAS 115 or PGW 130. The PCRF 145 may confirm that the message is in an appropriate format upon receipt. Further, the message handler 210 may convert the accounting message into a common format as needed. The method 300 may then proceed to step 315.

In step 315, PCRF 145 may determine which subscriber is associated with the accounting message. PCRF 145 may also determine a rating factor based on the accounting message, the subscriber ID, and whether the accounting message if from the fixed line network 110 or the mobile network 125.

In step 320, PCRF 145 may apply the rating factor to the received usage and accumulate the subscriber usage in the usage metric. The method 300 may then proceed to step 325.

In step 325, PCRF 145 may retrieve the metering policy associated with the subscriber. In various embodiments, the metering policy may depend on subscriber information such as, for example, a service agreement. In step 330, PCRF 145 may determine whether the subscriber's usage as indicated by the usage metric has exceeded a threshold. PCRF 145 may compare the newly stored usage metric for a subscriber to the threshold for the subscriber in the metering policy. If the stored value exceeds the threshold, the method 300 may proceed to step 335. Otherwise, the method may proceed to step 350, where the method ends.

In step 335, PCRF 145 may apply the metering policy corresponding to the exceeded threshold. PCRF 145 may notify the subscriber by generating an email or other communication. The notification may include the stored value for the subscriber's usage and the threshold that was crossed. The notification may further include one or more other thresholds associated with the usage and the policy that will be applied if the thresholds are exceeded. PCRF 145 may change the QoS that will be authorized for the subscriber session. PCRF 145 may alter QoS rules storage 240 to change the QoS. For example, PCRF 145 may add an additional rule authorizing a lower QoS for subscribers that have exceeded a threshold. Alternatively, QoS rules storage 240 may already include the appropriate rule, and PCRF 145 may ensure that the appropriate rule is applied by changing a flag or other value associated with the subscriber. PCRF 145 may terminate a subscriber session using QoS rules that do not authorize a session. Alternatively, PCRF 145 may terminate a session by updating the session information storage and sending a disconnect message.

In step 340, PCRF 145 may authorize a QoS for a subscriber session. PCRF 145 may check the conditions for each rule within QoS rules storage 240. When PCRF 145 finds a rule where all the conditions are met, it may authorize the QoS of the rule for the subscriber session. PCRF 145 may update session usage and information storage 220 to include the authorized QoS and a session reauthorization time. The QoS may be changed for one or both of the fixed line network 110 and the mobile network 125. The rules may have different QoS values and options for the fixed line network 110 and the mobile network 125 for a given threshold. The method 300 may then proceed to step 345.

In step 545, PCRF 145 may transmit a usage policy action message including the authorized QoS. The usage policy action message may be transmitted to one or both of the NAS 135 and PGW 130. The method 300 may then proceed to step 350, where the method ends.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method for determining the usage of a subscriber to mobile and fixed line services comprising:
   receiving subscriber usage information from a fixed line network;
   receiving subscriber usage information from a mobile network;
   computing a usage metric based upon the received subscriber usage information from the fixed line network and the mobile network and rating factor information;
   comparing the usage metric to a predetermined usage threshold;
   determining a usage policy action; and
   transmitting a usage policy action message.

2. The method of claim 1, wherein receiving the subscriber usage information from the fixed line network includes receiving a RADIUS message.

3. The method of claim 2, further comprising converting the RADIUS message into a DIAMETER message.

4. The method of claim 1, wherein receiving the subscriber usage information from the mobile network includes receiving a DIAMETER message.

5. The method of claim 1, wherein the subscriber usage information from a fixed line network is received from a network access server.

6. The method of claim 1, wherein the subscriber usage information from a mobile network is received from a Gx gateway.

7. The method of claim 1, wherein the usage policy action includes decreasing the quality of service for the subscriber.

8. The method of claim 1, wherein the usage policy action includes denying service to the subscriber.

9. The method of claim 8, further comprising:

receiving a recharge message;
updating the usage threshold based upon the recharge message; and
reinitiating service to the subscriber.

10. The method of claim 1, wherein the usage policy action includes sending a message to the subscriber indicating a subscriber usage status.

11. The method of claim 1, wherein the usage policy action includes redirecting the subscriber to a website in order to increase a usage limit for the subscriber.

12. The method of claim 1, wherein the usage information from a fixed line network includes data and long distance phone usage.

13. The method of claim 1, wherein the usage information from a mobile network includes data and time of phone usage.

14. The method of claim 1, wherein the usage metric indicates an amount of money.

15. The method of claim 1, wherein the usage policy action message includes different actions for the fixed line network and the mobile network.

16. A policy control node that determines a combined usage of a fixed line network and mobile network by a subscriber, comprising:
a first interface that communicates with a fixed line network server;
a second interface that communicates with a mobile network server;
a usage analyzer that receives usage reports from the fixed line network server and the mobile network server to produce a subscriber usage metric;
a session manager that manages subscriber sessions; and
a policy engine that determines the network policies to apply to the fixed line network and the mobile network based upon the subscriber usage metric.

17. The policy control node of claim 16, further comprising a billing interface connected to the usage analyzer that communicates with a billing system.

18. The policy control node of claim 16, further comprising a threshold that the policy engine compares to the subscriber usage metric.

19. The policy control node of claim 16, further comprising a plurality of thresholds that the policy engine compares to the subscriber usage metric, wherein a policy action is associated with each of the plurality of thresholds.

20. The policy control node of claim 19, wherein the policy action includes changing a subscriber quality of service.

21. The policy control node of claim 19, wherein the policy action includes denying service to the subscriber.

22. The policy control node of claim 19, wherein the policy action includes sending a message to the subscriber indicating a subscriber usage status.

23. The policy control node of claim 19, wherein the policy action includes redirecting the subscriber to a website in order to increase a usage limit for the subscriber.

24. The method of claim 1, further comprising transmitting subscriber usage information to a billing system configured to produce a single subscriber bill for fixed line network and mobile network usage.

* * * * *